United States Patent

Poussin

[15] 3,680,004

[45] July 25, 1972

[54] WIDE-BAND FREQUENCY-CONVERTING AND AMPLIFYING CIRCUITS

[72] Inventor: Antoine Poussin, Paris, France

[73] Assignee: Thomson-CSF, Paris, France

[22] Filed: Oct. 19, 1970

[21] Appl. No.: 81,722

[30] Foreign Application Priority Data

Oct. 24, 1969 France ................................6936502

[52] U.S. Cl. ................................332/19, 325/148, 329/136, 331/23

[51] Int. Cl. ................................H03c 3/08

[58] Field of Search ....................332/16, 18, 19, 16 T, 16 L; 329/136, 178, 179; 325/146, 148, 346, 184, 433; 331/18, 23, 25, 175

[56] References Cited

UNITED STATES PATENTS 3,075,157 1/1963 Fisher et al. ........................332/19 X 3,486,134 12/1969 Seidel ................................332/19 X 3,514,718 5/1970 Newton...............................331/25 X

*Primary Examiner*—Alfred L. Brody

*Attorney*—Cushman, Darby & Cushman

[57] ABSTRACT

In a circuit for translating to a variable carrier frequency an input signal with a fixed carrier frequency, comprises said signal at said variable frequency, the linearity of the amplifier being obtained by means of a negative feedback loop between the output of the amplifier and of the signal input of the frequency converter and this feedback loop including a frequency converter for re-translating the feedback signal to the frequency of the input signal, the variable phase-shifter ensuring the addition in phase opposition, in an adder, of the input signal and of the feedback signal is inserted between this adder and the frequency converter feeding the amplifier.

This location of the phase-shifter causes the gain of the circuit to be substantially independent of the variable frequency which is used. In addition the phase-shifter is automatically controlled.

2 Claims, 2 Drawing Figures

WIDE-BAND FREQUENCY-CONVERTING AND AMPLIFYING CIRCUITS

The present invention relates to improvements in frequency-changing and amplifying circuits.

Such circuits, comprising a frequency-converter followed by an amplifier, are generally used in single band or independent band transmission, where various transmission carrier frequencies are used.

It is known, for ensuring the linearity of such circuits, to provide a negative feedback loop coupling the output of the amplifier to the signal input of the mixer, the feedback loop including a second mixer translating the feedback signal back to the input frequency of the circuit, and a variable phase shifter ensuring the addition in phase opposition of the feedback signal to the input signal. The variable phase-shifter is generally located so as to operate at the fixed input frequency, which is obviously preferable.

Wide band amplifiers unfortunately impart to their input signal a phase-shift which varies as a function of the signal frequency; the variation range of this phase-shift may reach several hundreds of degrees from one extremity of the band to the other.

Variable phase-shifters on the other hand impart an attenuation which is a function, not only of the frequency of the signal to be phase-shifted, but also of the phase-shift which they bring about; this is a serious drawback where the variation of the phase-shift imparted by the amplifier and consequently the variation of the attenuation which will be caused by the phase-shifter, which latter variation will impair the feedback, are important.

It is an object of the present invention to remedy this drawback. This object is achieved by an appropriate location of the phase-shifter.

According to the invention, there is provided a frequency converting and amplifying circuit comprising: a main input for receiving a signal; summing means having a first input coupled to said main input, a second input and an output; a variable phase-shifter having an input coupled to said output of said summing means, and an output; a first mixer having a first input coupled to said output of said summing means, a second input and an output; an amplifier having an input coupled to said output of said mixer; a feedback loop including a second mixer having a first input coupled to said output of said amplifier, a second input and an output which is coupled to said second input of said summing means; and variable frequency generating means for feeding said second inputs of said first and second mixers.

The invention will be better understood and other of its features rendered apparent, from a consideration of the ensuing description and the attached drawings in which.

Figure 1:
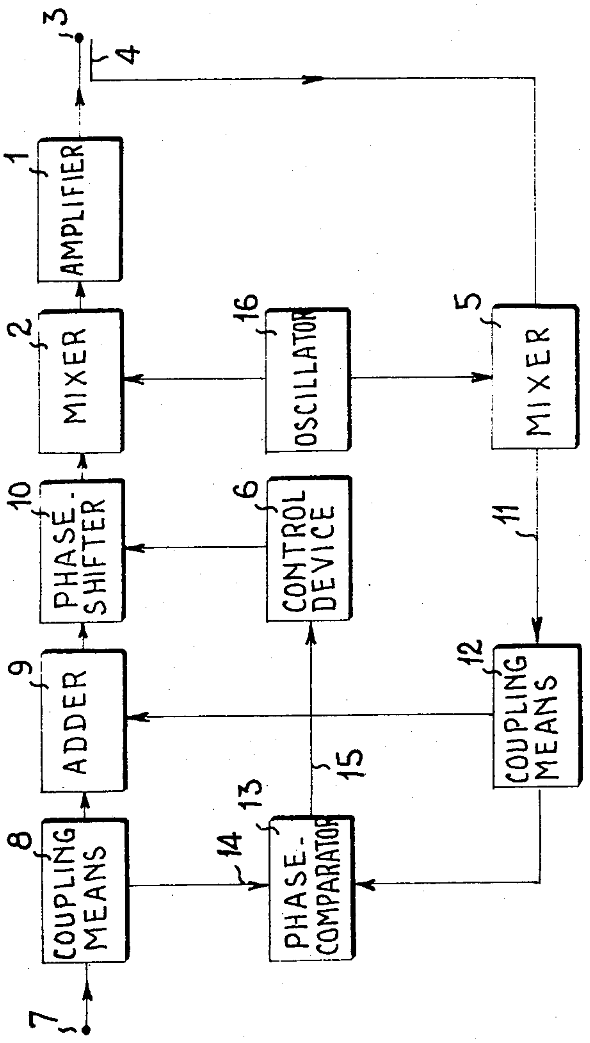
FIG. 1 is a more detailed embodiment of the invention.

In FIG. 1, an amplifier 1 receives variable frequency signals from a mixer 2 and supplies them in amplified form at its output 3, a certain fraction of these signals being tapped off at 4 to supply a mixer 5. A variable-frequency generator 16, for example a manually controlled variable oscillator supplies a wave signal in parallel to the mixers 2 and 5. The mixer 2 converts the fixed carrier frequency signals applied at the input of the circuit 7, this after those signals have successively passed through coupling means 8, a summing device 9 and a variable phase-shifter 10. The signals delivered at the output 11 of the mixer 5 are directed by coupling means 12 to the summing device 9 and to a comparator 13 which latter also receives at its second input 14, connected to an output of the coupling means 8, a fraction of the signals injected at 7, and delivers at its output 15 a signal which is supplied to control means 6 of the phase-shifter 10.

The amplifier 1 whose linearity is to be improved receives a feedback signal through the mixer 2. The negative feedback loop comprises the mixer 5 which is supplied with a fraction of the amplifier output signal tapped off at 4. The mixer 5 translates its input signal to a carrier frequency identical to that of the signals applied to the input 7, that is to say a constant frequency. This feedback signal is applied through the coupling means 12 to the summing device 9, the two input signals of which are added in phase opposition through an appropriate setting of the variable phase-shifter 10 controlled with the help of the means 6 by the phase-comparator 13.

Let $g$ be the gain of amplifier 1 when the feedback loop is open, and $\beta$ the fraction of the output signal tapped off for the feedback, the gain of the system, if the phase-shifter did not impart any attenuation, would be, according to a well known formula:

$g/(1 + \beta g)$, i.e. $1/\beta$ if 1 may be disregarded as compared with $\beta g$.

Let $p$ be the variable attenuation ratio of the phase-shifter.

If the phase-shifter is inserted at the output of the adder 9, the gain of the system is $gp/(1 + \beta gp)$, i.e. again $1/\beta$, if 1 may be disregarded as compared with $\beta gp$.

On the other hand, if the phase-shifter is inserted according to known art, i.e. in the feedback input of the adder 9, the gain of the system becomes $g/(1 + \beta gp)$, i.e. $1/\beta p$ if 1 may be disregarded as compared with $\beta gp$.

The improvement of the constancy of the gain is thus very considerable.

In the above formula the factors which are constant in all the cases have been disregarded.

An embodiment of the control means b, in the terminal stages of a single side-band transmitter, will now be described.

Figure 2:
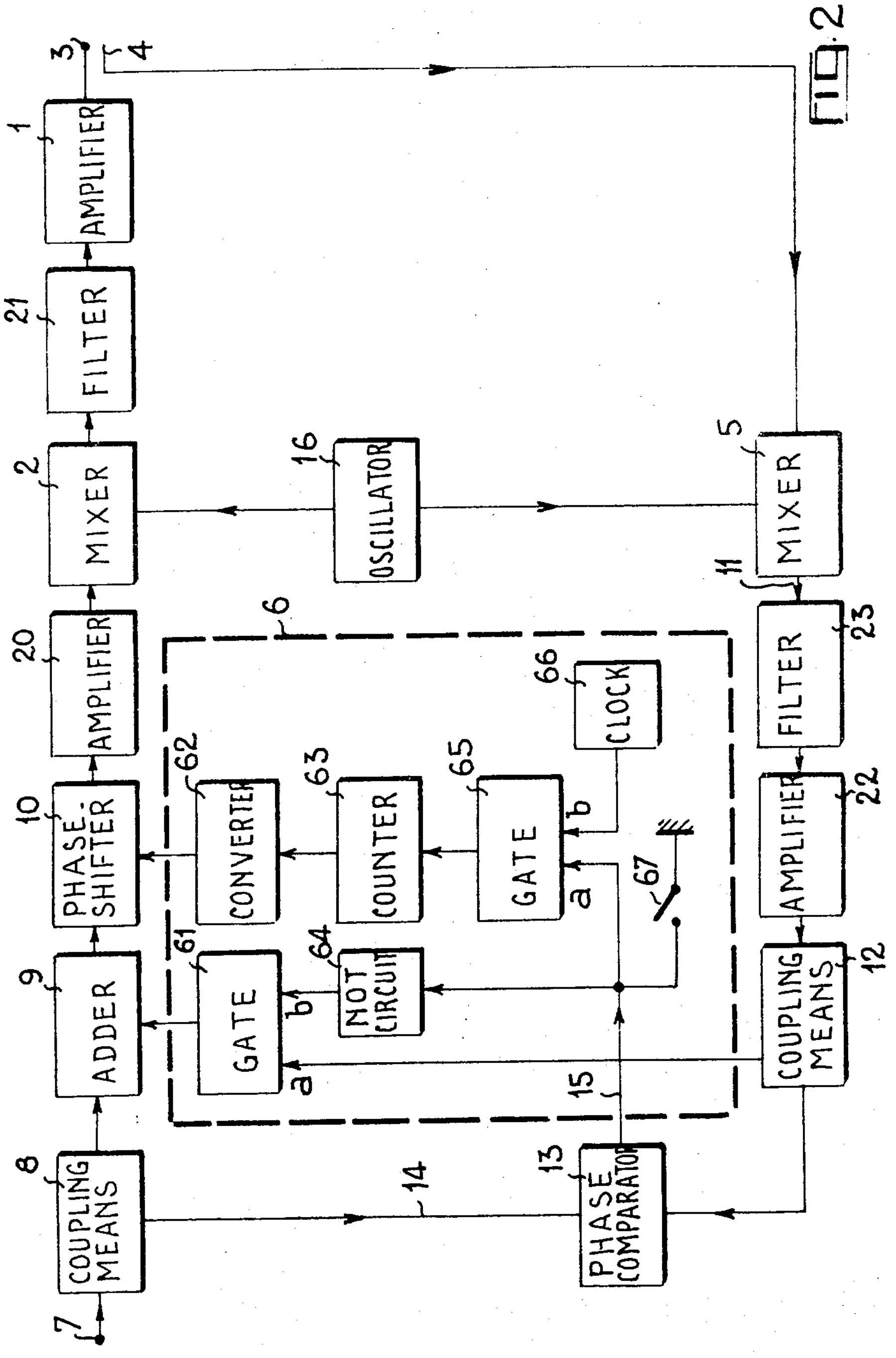
FIG. 2 is the diagram of a practical embodiment of a circuit in accordance with the invention.

In FIG. 2, where the same reference numbers as those used in FIG. 1 represent the same elements, the control means 6 have been shown in detail. On the other hand, further elements have been shown in the circuit, i.e., a filter 23 followed by an amplifier 22 between the mixer 5 and the coupling means 12; a filter 21 between the mixer 2 and the amplifier 1; and an amplifier 20 between he phase-shifter 10 and the mixer 2.

The amplifiers 22 and 20 are designed to produce the requisite signal levels respectively in the negative feedback loop and in the input to the mixer 2. The passband of the filter 21 is selected to pass the range of operating frequencies of the transmitter. That of the filter 21 defines the passband of the loop, whose bandwidth should be such as to transmit without substantial variation in relative phase, all the frequencies contained in the spectrum of the transmitted signal. This condition is readily satisfied since the carrier frequency of the signal, at this stage of the circuit, is constant whatever the operating frequency of the transmitter and can be made sufficiently high to avoid such variations, thus making it possible to achieve substantial negative feedback factors with a good compromise between power and linearity in the output stages of the transmitter.

The control means 6 comprise a gate 65 whose first input *a* receives the signal from the output 15 of the comparator 13, which output can be grounded by means of the switch 67. The second input *b* of the gate 65 receives the pulses delivered by a clock 66. The gate 65 controls the phase-shifter 10 through a binary counter 63 and a digital-to-analogue converter 62. The coupling means 12 supply the added 9 through the first input *a* of a gate 61 whose second input *b* is connected to the output 15 of the comparator 13 through a NOT-circuit 64.

The phase-comparator 13, of otherwise conventional type is so adjusted, by means of a phase-shifter operating on only one of its input signals, that it delivers a zero output signal when the input signals of the adder 9 are in phase-opposition. On the other hand the output of the comparator 13 is provided with an output circuit converting its output signal in a d.c. signal of predetermined amplitude when this phase-opposition condition is not substantially fulfilled.

When this condition is fulfilled the gate 61 is open and the gate 65 closed, so that control of the phase-shift element 10 is inhibited and the feedback loop closed. If phase opposition is not obtained, the comparator 13 blocks the gate 61 through the NOTegate 64 thus open-circuiting the feedback loop - and opens the gate 65 so that the binary counter 63 receives the clock pulses.

Let it be assumed that the counter contains N stages.

The successive pulses from the clock 66 cause the state of the binary counter 63 to change, so that at the output of the converter 62 a control voltage having $2^N$ equidistant steps corresponding to $2^N$ phase-shift steps (0° to 360°), appears, N being determined as a function of the desired phase accuracy.

The switch 67 is open for phase resetting during the automatic control sequence which accompanies a change in transmission frequency. On closing, it ensures maintenance of the phase conditions corresponding to a period of operation at a given frequency.

The achievement of the automatic control is greatly facilitated, and its accuracy improved, by the fact that the phase-comparator also operates at a fixed frequency.

Finally, in the case where the bandwidth of the power amplifier is employed for simultaneously transmitting several carriers modulated at different frequencies, the devices described lend themselves readily to independent negative feedbacks, this being achieved by multiplying the number of equipments provided up-circuit of the mixer 2 and down-circuit of the mixer 5 by the number of separate carriers which are used.

By way of example, with $F_F$ designating the fixed frequency of the carrier modulated by the information transmitted at 7, $F_H$ the frequency of the signal generated at 16 and $F_S$ the frequency of the carrier of the output signal, the device described has been operated experimentally, the mixers 2 and 5 operating in accordance with the following respective conditions $F_S = \pm(F_F - F_H)$ and $F_F = F_H \pm F_S$ where $F_F = 102.5$ mc/s and $F_S$ varies from 2 to 30 mc/s.

What is claimed is:

1. A frequency converting and amplifying circuit comprising: a main input for receiving a signal; summing means having a first input coupled to said main input, a second input and an output; a variable phase-shifter having an input coupled to said output of said summing means, and an output; a first mixer having a first input coupled to said output of said summing means, a second input and an output; an amplifier having an input coupled to said output of said mixer; a feedback loop including a second mixer having a first input coupled to said output of said amplifier, a second input and an output which is coupled to said second input of said summing means; variable-frequency generating means for feeding said second inputs of said first and second mixers; a phase comparator having two inputs respectively coupled to said output of said second mixer and to said main input, and an output; and further means for controlling said variable phase-shifter as a function of the output signal of said phase-comparator.

2. A frequency converting and amplifying circuit as claimed in claim 1, wherein said further means comprise a clock, a gate having two inputs respectively coupled to said output of said phase-comparator and to said clock and an output; a counter having an input coupled to said output of said gate and an output; and a digital-to-analogue converter having an input coupled to said output of said counter and an output coupled to said phase-shifter.

* * * * *